United States Patent
Lepp et al.

(10) Patent No.: US 11,070,633 B2
(45) Date of Patent: Jul. 20, 2021

(54) PRE-ASSOCIATION DISCOVERY OF SERVICES

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/190,909

(22) Filed: Nov. 14, 2018

(65) Prior Publication Data
US 2019/0082020 A1    Mar. 14, 2019

Related U.S. Application Data (63) Continuation of application No. 14/851,368, filed on Sep. 11, 2015, now Pat. No. 10,148,769.

(51) Int. Cl.
| | |
|---|---|
| *H04L 29/08* | (2006.01) |
| *H04L 29/06* | (2006.01) |
| *H04W 4/80* | (2018.01) |
| *H04W 84/12* | (2009.01) |

(52) U.S. Cl.
CPC .......... *H04L 67/16* (2013.01); *H04L 67/2804* (2013.01); *H04L 67/42* (2013.01); *H04L 67/2828* (2013.01); *H04L 67/32* (2013.01); *H04W 4/80* (2018.02); *H04W 84/12* (2013.01)

(58) Field of Classification Search
CPC ..... H04L 67/16; H04L 67/42; H04L 67/2804; H04L 67/32; H04L 67/2828; H04W 84/12; H04W 4/80
See application file for complete search history.

(56) References Cited

U.S. PATENT DOCUMENTS

| | | | | |
|---|---|---|---|---|
| 7,155,502 | B1 * | 12/2006 | Galloway | H04L 41/082 709/223 |
| 7,324,447 | B1 * | 1/2008 | Morford | H04L 41/08 370/231 |
| 8,081,610 | B2 * | 12/2011 | Stirbu | H04W 8/18 370/338 |
| 8,384,542 | B1 * | 2/2013 | Merrill | G08B 25/08 340/541 |

(Continued)

FOREIGN PATENT DOCUMENTS

| | | |
|---|---|---|
| CA | 2848754 | 3/2013 |
| CA | 2854947 | 5/2013 |

(Continued)

OTHER PUBLICATIONS

European Patent Office, Supplementary European Search Report for Appl. No. 16843323.3 dated Feb. 12, 2019 (8 pages).

(Continued)

*Primary Examiner* — Jimmy H Tran
(74) *Attorney, Agent, or Firm* — Trop, Pruner & Hu, P.C.

(57) ABSTRACT

A network node of a wireless local area network (WLAN) filters, based on at least one policy, information about services available via the network node. The network node sends, to a wireless device as part of a pre-association discovery operation of the wireless device, the filtered information about the services.

19 Claims, 5 Drawing Sheets

(56) References Cited

U.S. PATENT DOCUMENTS

| | | | | |
|---|---|---|---|---|
| 8,612,612 | B1* | 12/2013 | Dukes | H04L 67/141 709/228 |
| 8,825,109 | B2* | 9/2014 | Montemurro | G06F 9/5011 455/552.1 |
| 8,942,221 | B2* | 1/2015 | McCann | H04W 8/18 370/349 |
| 9,301,127 | B2* | 3/2016 | McCann | H04W 8/186 |
| 10,284,659 | B2* | 5/2019 | Cheshire | H04L 61/1511 |
| 2002/0099829 | A1* | 7/2002 | Richards | H04L 69/04 709/227 |
| 2008/0040666 | A1* | 2/2008 | Wang | G06Q 30/02 715/210 |
| 2008/0228942 | A1* | 9/2008 | Lor | H04W 12/1202 709/238 |
| 2008/0279161 | A1* | 11/2008 | Stirbu | H04L 67/16 370/338 |
| 2009/0163223 | A1* | 6/2009 | Casey | H04W 36/22 455/453 |
| 2009/0245492 | A1* | 10/2009 | Baker | H04L 67/14 379/112.01 |
| 2012/0110159 | A1* | 5/2012 | Richardson | H04L 29/06 709/223 |
| 2012/0113964 | A1* | 5/2012 | Petersen | H04L 12/2809 370/338 |
| 2012/0243524 | A1* | 9/2012 | Verma | H04W 48/16 370/338 |
| 2013/0065555 | A1* | 3/2013 | Baker | G06Q 10/103 455/410 |
| 2013/0070739 | A1* | 3/2013 | McCann | H04W 48/16 370/338 |
| 2013/0230036 | A1* | 9/2013 | Reznik | H04L 67/16 370/338 |
| 2013/0301607 | A1* | 11/2013 | McCann | H04W 36/0072 370/331 |
| 2014/0010222 | A1* | 1/2014 | Chen | H04W 48/16 370/338 |
| 2014/0016628 | A1* | 1/2014 | McCann | H04L 63/0823 370/338 |
| 2014/0126563 | A1* | 5/2014 | Chen | H04W 48/14 370/338 |
| 2014/0214958 | A1* | 7/2014 | Cheshire | H04L 61/1511 709/204 |
| 2014/0293978 | A1* | 10/2014 | Yang | H04W 8/005 370/338 |
| 2014/0359148 | A1* | 12/2014 | Cherian | H04L 41/28 709/229 |
| 2014/0362735 | A1* | 12/2014 | Mahaffy | H04L 67/16 370/254 |
| 2015/0012749 | A1* | 1/2015 | Huang | H04W 12/06 713/168 |
| 2015/0142968 | A1* | 5/2015 | Bhagwat | H04L 67/16 709/224 |
| 2015/0206190 | A1* | 7/2015 | Lee | H04W 48/16 705/14.64 |
| 2015/0208324 | A1* | 7/2015 | McCann | H04W 48/10 370/338 |
| 2015/0208325 | A1* | 7/2015 | Ryu | H04W 48/14 455/3.05 |
| 2015/0341849 | A1* | 11/2015 | Lee | H04W 48/16 455/41.2 |
| 2015/0363704 | A1* | 12/2015 | Yong | H04W 4/50 706/46 |
| 2016/0007267 | A1* | 1/2016 | Watt | H04W 12/0808 370/254 |
| 2016/0057237 | A1* | 2/2016 | Yang | H04L 67/16 709/224 |
| 2016/0073438 | A1* | 3/2016 | Verma | H04W 48/16 370/329 |
| 2016/0080962 | A1* | 3/2016 | Harris | H04W 4/16 370/252 |

FOREIGN PATENT DOCUMENTS

| | | |
|---|---|---|
| CA | 2872882 | 11/2013 |
| CA | 2878980 | 1/2014 |
| CA | 2900420 | 8/2014 |
| CA | 2930087 | 7/2015 |

OTHER PUBLICATIONS

Canadian Intellectual Property Office, International Search Report and Written Opinion for PCT/CA2016/050865 dated Sep. 27, 2016 (17 pages).
https://developer.apple.com—About Bonjour, Apr. 2013 (2 pages).
https://developer.apple.com—Bonjour API Architecture, Apr. 2013 (1 page).
https://hobbyistsoftware.com—Bonjour Browser for Windows dated on or before Aug. 31, 2015 (2 pages).
https://developer.apple.com—Bonjour Concepts, Apr. 2013 (5 pages).
https://developer.apple.com—Bonjour Operations, Apr. 2013 (5 pages).
IEEE P802.11aq/D1.2, Draft Standard for Information Technology—Telecommunications and Information exchange between systems—Local and metropolitan area networks—Specific Requirements—Part 11: Wireless LAN Medium Access Control (MAC) and Physical Layer (PHY) specifications, May 10, 2015 (41 pages).
McCann et al., IEEE P802.11—Task Group U—Meeting Update, Status of IEEE 802.11 Study Group—Infrastructure Service Discovery (IDS) dated on or before May 14, 2012 (2 pages).
WiFi Alliance, Neighbor Awareness Networking Technical Specification, Version 1.0, May 1, 2015 (98 pages).
Cotton et al., Internet Engineering Task Force (IETF), RFC 6335 Internet Assigned Numbers Authority (IANA) Procedures for the Management of the Service Name and Transport Protocol Port Number Registry, Aug. 2011 (33 pages).
Cheshire et al., Internet Engineering Task Force (IETF), RFC 6763 DNS Based Service Discovery, Feb. 2013 (49 pages).
UPnP Forum, UPnP Device Architecture 1.1, Document Revision Date: Oct. 15, 2008 (136 pages).
WiFi Alliance, Discover WiFi—Wi-Fi Aware dated on or before Sep. 6, 2015 (3 pages).
WiFi Alliance, Wi-Fi Peer-to-Peer (P2P) Technical Specification, Version 1.5, Aug. 4, 2014 (183 pages).
Wi-Fi Alliance Technical Committee Application Service Platform Task Group, Wi-Fi Peer-to-Peer (P2P) Technical Specification, ASP2 Draft Addendum, Version 0.0.1 r03, 2015 (10 pages).
WiFi Alliance, Application Service Platform 2 (ASP2) Technical Specification, Version 0.0.1 r02, 2015 (19 pages).
IEEE Standard for Information technology, Telecommunications and information exchange between systems Local and metropolitan area networks, Specific requirements, Part 11: Wireless LAN Medium Access Control (MAC) and Physical Layer (PHY) Specifications, IEEE P802.11-REVmc/D4.0, Jan. 2015, pp. 1-1999.
IEEE Standard for Information technology, Telecommunications and information exchange between systems Local and metropolitan area networks, Specific requirements, Part 11: Wireless LAN Medium Access Control (MAC) and Physical Layer (PHY) Specifications, IEEE P802.11-REVmc/D4.0, Jan. 2015, pp. 2000-3610.
European Patent Office, Communication pursuant to Article 94(3) EPC for Appl. No. 16843323.3 dated Jan. 22, 2020 (4 pages).

* cited by examiner

PRE-ASSOCIATION DISCOVERY OF SERVICES

CROSS REFERENCE TO RELATED APPLICATION

This is a continuation of U.S. application Ser. No. 14/851,368, filed Sep. 11, 2015, which is hereby incorporated by reference.

BACKGROUND

Devices such as computers, handheld devices, or other types of devices can communicate over wired or wireless networks. Wireless networks can include a wireless local area network (WLAN), which includes wireless access points (APs) to which devices are able to wirelessly connect.

BRIEF DESCRIPTION OF THE DRAWINGS

Some implementations are described with respect to the following figures.

DETAILED DESCRIPTION

In a wireless local area network (WLAN), a wireless device may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 Specifications. In other examples, WLANs can operate according to other protocols. Examples of wireless devices include computers (e.g. tablet computers, notebook computers, desktop computers, etc.), handheld devices (e.g. smart phones, personal digital assistants, etc.), wearable devices (smart watches, electronic eyeglasses, etc.), game appliances, health monitors, vehicles (or equipment in vehicles), or other types of endpoint or user devices that are able to communicate wirelessly.

Various services may be available in a WLAN. These services can be provided by various devices coupled to the WLAN. Examples of devices (hereinafter referred to as "server devices") that can provide services include printers that can provide print services, cloud resources that can provide processing services, storage services, and/or communication services, application servers that can provide application services, and so forth. Although services can be provided by server devices separate from an AP or other WLAN network node, it is noted that in other implementations, a service can be provided by an AP or other WLAN network node.

Traditionally, a wireless device is able to perform discovery of services after the wireless device has associated with an AP, or more generally, to a network node of the WLAN. A "network node" in a WLAN can refer to an AP, or alternatively, a "network node" in a WLAN can refer to a WLAN controller or WLAN gateway, where a WLAN controller or WLAN gateway is a controller of multiple APs (or more specifically, of multiple wireless transceivers, sometimes referred to as radio heads, that are able to perform wireless communications with wireless devices).

In the ensuing discussion, reference is made to a wireless device interacting with an AP in a WLAN. Note that techniques or mechanisms according to some implementations can also be applied in scenarios where a wireless device interacts with another type of WLAN network node, such as a WLAN controller or WLAN gateway that controls multiple APs (or transceivers).

A wireless device is associated with an AP (or more generally, a WLAN network node) if the wireless device has exchanged information with the AP such that the wireless device is able to communicate data through the AP to other endpoint devices. In some examples, an association procedure between the wireless device and an AP can include the wireless device sending an association request to the AP, the AP determining whether its capabilities match those requested by the wireless device, and the AP sending an association response with a success indication to grant network access to the wireless device. At this point, the wireless device is considered to be associated with the AP such that data transfer can occur between the wireless device and the AP. The process of associating with the AP can also be referred to as joining the WLAN, or joining the BSS (Basic Service Set).

According to IEEE 802.11, a station (STA) is a device that has the capability to use the 802.11 protocol. A STA can be an AP, or alternatively, a STA can be a non-AP STA, such as any of the wireless devices discussed above.

IEEE 802.11aq is a protocol between STAs, such as between a non-AP STA and an AP, to exchange information about services that are provided in a WLAN. IEEE 802.11aq supports pre-association service discovery, where a wireless device is able to discover services available from APs in the WLAN prior to the wireless device associating with the APs. More generally, pre-association service discovery allows a wireless device to discover services that can be provided via the AP prior to the wireless device being associated or otherwise attached to the AP. A wireless device not yet associated with an AP (or more generally, a WLAN network node) is referred to as a "pre-associated wireless device." A service is available via an AP (or more generally, a WLAN network node) if the service (which can be provided by a separate server device) can be accessed by the wireless device through the AP (or more generally, a WLAN network node). The device providing the service may be a wireless device also associated to the AP, a wireless device attached to a different AP in the WLAN, or a wired device connected to a LAN that is connected to the WLAN. Pre-association discovery (PAD) may also be referred to as Infrastructure Service Discovery (ISD).

The ability of a wireless device to perform pre-association service discovery of services available by a respective APs enables the wireless device to select one or more of the APs to associate with. Pre-association service discovery can also be used for other purposes.

The following describes various issues that can arise due to pre-association discovery of services.

Issue 1

An AP (or more generally, a WLAN network node) can have access to a service database that includes information regarding services that are available to a wireless device via the AP once the wireless device associates with the AP. The service database can also be referred to as a service proxy or a pre-association discovery (PAD) proxy entity, according to IEEE 802.11aq. In the ensuing discussion, reference is made to a service proxy. In other examples, other types of service databases can be employed. A service database or service proxy can refer to any collection of information about services, where such information about services can describe various attributes of the services, such as service name, Internet Protocol (IP) address, priority, and so forth (additional attributes are discussed further below).

The AP is able to advertise the capability to connect to services identified by the service proxy. Such an AP can also be referred to as an "infrastructure service advertiser," since the AP is capable of advertising services and providing information about the services to wireless devices that are not yet associated with the AP. Note that the services can be provided by server devices coupled to the AP, either by wired or wireless connections. In some cases, it may not be appropriate to advertise all information of the services identified in the service database, or to advertise all of the services identified in the service proxy all of the time, such as due to constraints on both the AP and the wireless medium between the AP and a wireless device. Constraints can include restricted bandwidth, congestion, time of day, security, changes in the availability of a service, and so forth. Note that the availability of a particular service can be dynamic and can change over time.

Issue 2

Service discovery protocols have been designed to operate over networks (e.g. Bluetooth network, Ethernet network, cellular network, Wi-Fi network, etc.) where the connections have some level of trust. For example, the Wi-Fi protocols assume that the wireless connections between wireless devices and access points are associated (either with encrypted links or not). These protocols transmit device identity information and detailed information about service availability.

If such information is transmitted between pre-associated devices in a WLAN, any assumed level of security disappears as all such information is transmitted in the clear. This may be an issue as device identity information within the service discovery protocol exchange may be exposed to third parties, together with detailed information about available services that network may not wish to initially expose. For example a home network may support many services, and the owner of that home network may not wish to transmit all information about those services to the owner's immediate neighbours in clear text.

Issue 3

The content of over-the-air protocols to carry out WLAN pre-association discovery have been previously defined, but there is not yet any consensus on how to invoke the procedures or what to do in response.

With a WLAN operating in infrastructure mode (a mode where wireless devices communicate with other endpoints through APs), some issues may include one or more of the following:
What to do if multiple APs are found to support a target service in a WLAN.
What to do after an AP is found to support the target service (in other words, the next steps for the WLAN device are not defined).
How long to continue the search for a service if a match is not found.

Policy Engine for a WLAN Service Proxy

To address Issue 1 above, a policy engine can be provided to perform filtering of information about services that are available via an AP (or more generally, a WLAN network node).

Figure 1:
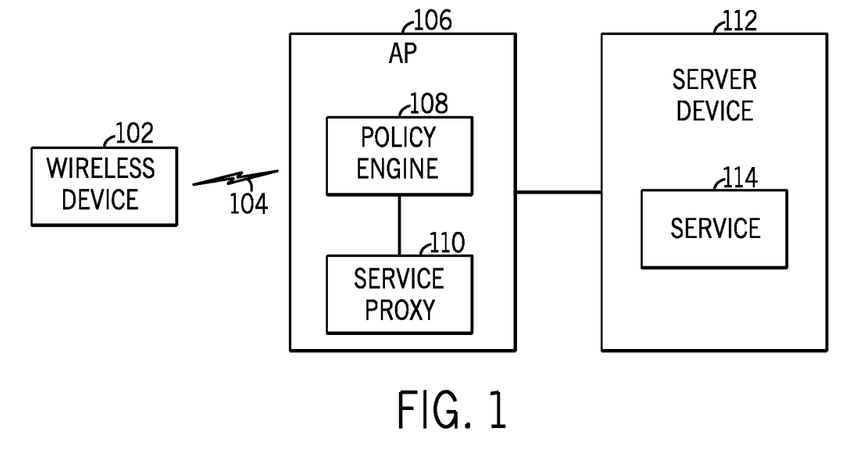
FIG. 1 is a block diagram of an example network arrangement according to some implementations.

FIG. 1 illustrates an example network arrangement that includes a wireless device 102 that is able to communicate wirelessly over a wireless link 104 with an AP 106. Although just one AP is shown in FIG. 1, it is noted that a WLAN can include multiple APs. Similarly, multiple wireless devices 102 can communicate with each AP 106.

The AP includes a policy engine 108 according to some implementations, which is able to apply filtering, based on one or more policies, of information about services included in a service proxy 110. The services identified by the information in the service proxy 110 are services that are available via the AP 106. The service proxy 110 can store information about services in one or more storage media.

As shown in FIG. 1, the policy engine 108 can be part of the AP 106 (or more generally, a WLAN network node). In alternative examples, the policy engine 108 can be separate from the AP 106 (or more generally, a WLAN network node).

FIG. 1 further shows a server device 112 that provides a service 114, which is one of the services described in the service proxy 110. Although just one server device 112 is depicted in FIG. 1, it is noted that there can be multiple server devices 112 that provide respective services that can be made available via the AP 106 or another AP (or more generally, by a WLAN network node).

The policy engine 108 is a logical entity, working alongside the service proxy 110, to determine what services are available via the AP 106, and if and when to advertise such services to pre-associated wireless devices. The policy engine 108 can advertise information about services by broadcasting the information to multiple pre-associated wireless devices within a coverage area of an AP (or more generally, a WLAN network node), unicast the information to a specific pre-associated wireless device, or send the information in a response to a query from a pre-associated wireless device.

For example, according to IEEE 802.11aq, three pre-association service discovery techniques can be employed. A first discovery technique includes an unsolicited PAD procedure in which an AP can include a service hint or a service hash in a beacon frame that is broadcast to multiple STAs. A service hash is produced by applying a hash function on a service name of a respective service, to produce a hash value. A service hint is bloom filter bit array which represents one or more services encoded using a method where both the length of a field and the probability of false positives are variable.

A second discovery technique includes a solicited PAD procedure, in which a STA sends a Probe Request containing one or more service hash elements (of corresponding one or more services) to an AP. The AP responds with a Probe Response sent to the STA if a service hash included in the Probe Request matches a hash of one of the services available via the AP (i.e. service(s) described in the service proxy 110).

A third discovery technique includes a STA sending an Access Network Query Protocol (ANQP) Service Information Request to request more detailed information about a service available via the AP. ANQP supports information retrieval from an Advertisement Server that supports a Generic Advertisement Service ("GAS"). ANQP and GAS are described in IEEE 802.11u and also IEEE 802.11-2012. The AP responds to the ANQP Service Information Request with an ANQP Service Information Response that contains detailed information of the service.

In other examples, other techniques of advertising service information to wireless devices can be employed.

The determination of if and when to advertise services is based on application of filtering by the policy engine 108. The filtering can be applied by the policy engine 108 in either or both of the following scenarios:

1) in response to storing information about services in the service proxy 110, or
2) in response to retrieving information about services from the service proxy 110 for the purpose of advertising the information about the services.

Figure 2:
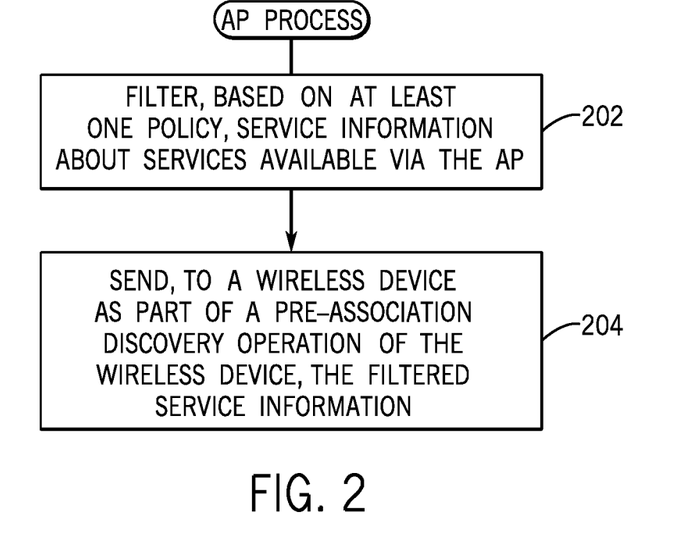
FIGS. 2 and 3 are flow diagrams of example processes of a network node in a wireless local area network (WLAN), according to some implementations.

FIG. 2 is a flow diagram of an example process that is performed by the AP 106, or alternatively, by a WLAN network node such as a WLAN controller or WLAN gateway.

The AP, and more specifically, the policy engine 108 of the AP, filters (at 202), based on at least one policy, service information about services available via the AP. The AP sends (at 204), to a wireless device (e.g. 102) as part of a pre-association discovery operation of the wireless device, the filtered service information. Alternatively, the AP can send the filtered service information to multiple pre-associated wireless devices.

Figure 3:
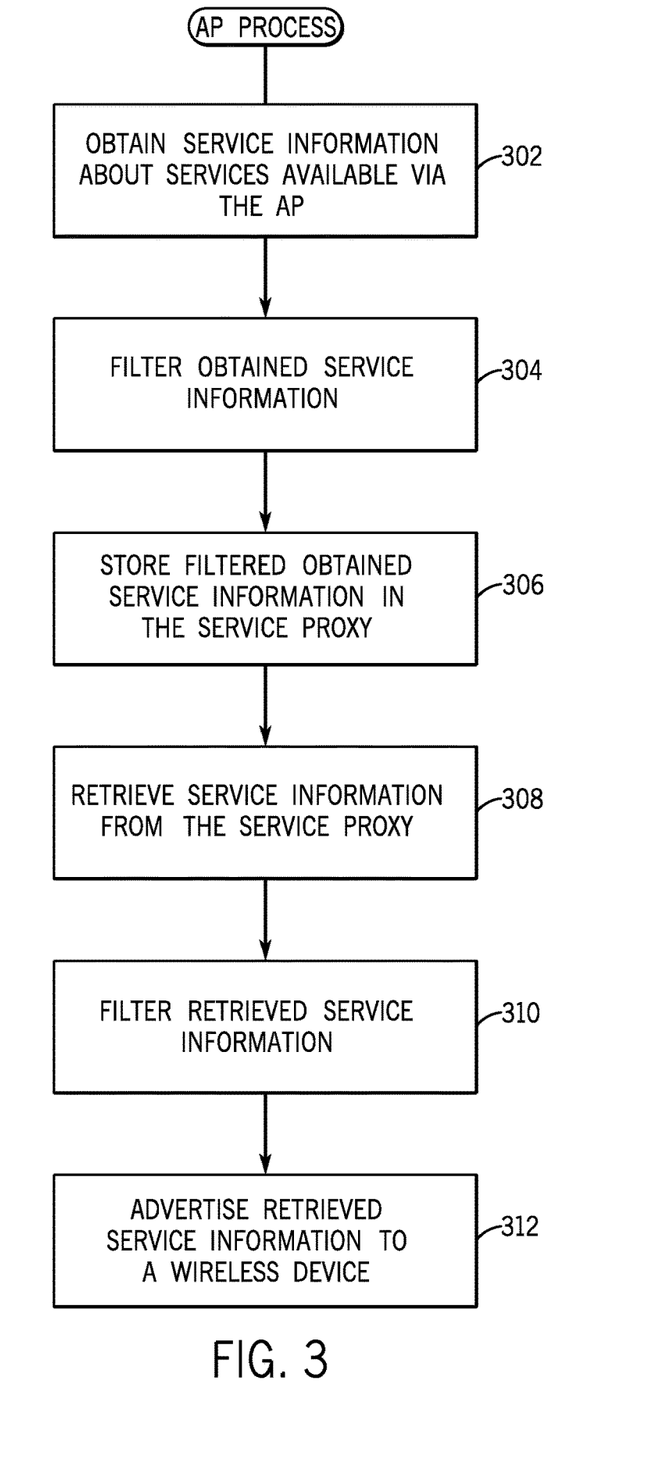

FIG. 3 is a flow diagram of a process of the AP 106, or more generally, of a WLAN network node. The AP obtains (at 302) service information about services available via the AP. The policy engine 108 can then be invoked to filter (at 304) the obtained service information, where the filtering is based on one or more policies. The filtered obtained service information can be stored (at 306) into the service proxy 110.

Later, the AP 106 can retrieve (at 308) service information from the service proxy 110. The policy engine 108 can be invoked to filter (at 310) the retrieved service information, where the filtering is based on one or more policies. The AP 106 then advertises (at 312) the filtered retrieved service information to a wireless device (or multiple wireless devices).

Although FIG. 3 shows the policy engine 108 being invoked in both tasks 304 and 310, it is noted that the policy engine 108 can be invoked to perform filtering in just one of the tasks 304 and 310 (i.e. either at the time of storing service information into the service proxy 110 or at the time of retrieving information from the service proxy 110).

To obtain service information (at 302), the AP 106 (or more generally, a WLAN network node) can use one or more techniques, such as those discussed below.

A first technique involves manual entry of the service information about services by a network administrator or other user into a management console, which can be a web-based management console or console available at the AP 106. Such manual entry of service information into a management console is referred to as manual service configuration.

A second technique involves the AP 106 listening to service advertisements from server devices, such as server device 112 shown in FIG. 1. The service advertisements can include advertisements that include Universal Plug and Play (UPnP) service descriptions. UPnP refers to a set of networking protocols that allow network devices to discover each other's presence on a network. UPnP can use an Extensible Markup Language (XML) data structure that contains a service name (of the service) as well as other information about the service. As an example, a Unique Service Name (USN) can be constructed, where the USN includes a Device Type and Service Type attribute. A UPnP device can provide one or more services.

Another type of service advertisement can include a service advertisement according to Domain Name System (DNS)-Service Discovery (DNS-SD), which allows for use of DNS programming interfaces, servers, and packet formats to browse a network for services. DNS-SD discovery is described further in IETF Request for Comments (RFC) 6763, entitled "DNS-Based Service Discovery," dated February 2013. Another name for DNS-SD is zero configuration networking. DNS-SD can be used in conjunction with Multicast DNS described in IETF RFC 6762.

A further type of service advertisement includes a Bonjour service advertisement, as provided by Apple.

The AP listens to such service advertisements and can store a list of the services advertised into the service proxy 110.

A third technique for collecting a list of services available on a network includes the AP (or more generally, a WLAN network node) sending discovery requests to associated 802.11 STAs or Ethernet ports, or all devices on a particular Internet protocol (IP) subnet. The devices receiving the discovery requests can send information about services to the AP.

A fourth technique for collecting a list of services include devices coupled to the WLAN providing information regarding services provided by such devices. Such devices can explicitly call an application programming interface (API) on the AP, or alternatively, the devices can call the service proxy 110 to register services provided by such devices. Note that the management console of the first technique can also use this same API to register services to advertise.

The following describes further information regarding filtering of obtained information, as performed (at 304) in FIG. 3.

Prior to the services being placed within the service proxy 110, filtering based on one or more policies can be applied by the policy engine 108. This filtering can be performed as all service information may not be appropriate for transmission to a pre-associated device. As an example, if the service information contains an IP address and/or port information of the service, it may not be desirable due to security concerns to transmit the IP address and/or port information to a pre-associated wireless device. More generally, the filtering can ensure that a service is advertised within a network to pre-associated wireless devices without exposing selected network details. For example, the filtering can permit only the service name and some basic information to be advertised instead of IP addresses and port information used in post-association procedures. As another example, the service may be filtered based on the service name, service type or other descriptor such as filtering out print services within the finance department of an enterprise, or filtering out a media server within a home environment.

Note that pre-association discovery only provides an indication of the service being available within the network, so that the device can then decide to associate (or not) to a particular AP. Thus, certain information (e.g. an IP address) about a service does not have to be sent to a pre-associated wireless device.

The policy engine 108 may also filter duplicate services prior to storing service information into the service proxy 110. If a service has disappeared from the network, or a service lifetime parameter has expired, the policy engine 108 can also remove the service from the service proxy 110.

In some examples, the storing of service information into the service proxy 110 (task 306 in FIG. 3) and/or the retrieving of service information from the service proxy 110 (task 308 in FIG. 3) can be performed utilizing a service proxy application programming interface (API), shown as 402 in FIG. 4 and described further below.

The filtering (at 310 in FIG. 3) performed by the policy engine 108 governs what services present in the service proxy 110 are advertised to pre-association wireless devices. Based on the filtering, the policy engine 108 may refrain from advertising services at times when bandwidth is restricted, for example, and the policy engine 108 can resume advertising services once more bandwidth is available.

The AP may be resource constrained and may not respond to pre-association service requests. For example, utilization of processing resources (e.g. central processing units or CPUs) in the AP may be too high, such that the AP is unable to process pre-association service requests. As another example, the interface to the service proxy 110 may be overloaded due to too many requests submitted to the service proxy 110. As a further example, the primary channel of the AP may be fully loaded. In cases where the AP is resource constrained, the policy engine 108 can decide when to respond to pre-association service requests, or can decide to refrain from responding to selected pre-association service requests.

In further examples, if a particular service is temporarily unavailable (for example, a printer is busy with a job), the policy engine 108 can cause the AP to refrain from advertising that service for a particular time duration (such as until the service becomes available again). A service provider of the service can update this state information regarding the service (e.g. state information indicating availability or lack of availability of the service) to the service proxy 110 and/or the policy engine 108, such as by use of the service proxy API 402 in FIG. 4.

The service proxy 110 may contain details about a service (such as network topology information) that is used by the service proxy 110 and the policy engine 108 to make decisions. However, the policy engine 108 may prevent sensitive network information (e.g. IP addresses of services) from being advertised to pre-association wireless devices.

In some implementations, the policy engine 108 can govern the lifecycle of services in the service proxy 110. For example the policy engine 108 can renew services listed in the service proxy 110 periodically. The policy engine 108 can remove services from the service proxy 110 that are no longer offered on the network (for example after a certain time if they are not renewed).

Some services may have a security level associated with them. A security level may specify that certain information (e.g. location or cost) should not be sent by the AP to a wireless device in the clear. The policy engine 108 may therefore filter the advertised service information based on such a policy.

To advertise filtered information (at 312 in FIG. 3) to one or more wireless devices, the policy engine 108 can pass the filtered service information to the AP (or AP(s) attached to the WLAN controller) for transmission to the pre-associated wireless devices.

APIs for Pre-association Service Discovery

To address issues 2 and 3 discussed above, APIs can be provided at the wireless device 102 and at the AP 106. As shown in FIG. 4, the service proxy API 402 is provided at the AP 106, and a service discovery API 404 is provided at the wireless device 102.

An API includes various routines or functions that can be invoked by a respective client to perform target tasks. For example, in the wireless device 102, applications 406 are clients that can invoke the routines or functions of the service discovery API 404. As another example, an API client 408 in the server device 112 can invoke routines or functions of the service proxy API 402.

The service proxy API 402 at the AP 106 can be used by server devices 112 to register services 114 for advertisement. The service discovery API 404 at the wireless device 102 can be used by the applications 406 or other code (executing in the wireless device 102) to instruct a service seeker 412 seek certain services over the air interface that are available via the AP 106.

Service Discovery API

At the wireless device 102, an application 406 or other code (such as operating system or OS software, etc.) can use the service discovery API 404 to register, with a service seeker 410 (also referred to as a "service proxy client"), services that the application 406 (or other code) is looking for (seeking). The service seeker 410 is a logical entity within the wireless device 102 that queries APs for available services. The applications 406 or other code can also call the service discovery API 404 to unregister a service that is no longer being sought.

A request to register or unregister a service that is invoked using the service discovery API 404 can include various parameters, such as one or more of the following: a service name or other service identifier, a length of time for which to continue seeking the identified service, a priority of the service, and so forth.

In response to a request to register a service, the service seeker 410 can add information about the service into a service seeker database (not shown). In response to a request to unregister a service, the service seeker 410 can remove information about the service from a service seeker database.

The service seeker 410 uses pre-association discovery (PAD) procedures over the air, to find an AP that supports access to one or more target services sought by an application 406 or other code. The service seeker 410 initiates service queries to APs while the wireless device 102 is in the pre-association state.

It should be noted that the PAD procedures discover whether an AP is capable of supporting the target service(s). The PAD procedures do not provide the service itself to the wireless device 102.

In some examples, the service discovery API 404 can be implemented as a system or OS level class, object or function that can be called by the applications 406 or other code to register services of interest to the applications 406 or other code. In one example, functions of the service discovery API 404 can interact with the service seeker 410 that is implemented as an android.net.connectivitymanager class. In another example, the service seeker 410 can be implemented as part of a WI-FI Application Service Platform 2 (ASP2) framework to handle service discovery.

After initial pre-association service discovery, the service discovery API 404 can also interact with a connection manager 412 (e.g. WLAN connection manager) to perform various additional tasks, such as performing authentication of the wireless device 102 with the AP 106, performing association with the AP 106, performing post-association service discovery, and session setup to establish a session with the AP 106. Note that the service seeker 410 can be implemented as part of the connection manager 412 or as a separate component from the connection manager 412.

If an AP is found that advertises one or more of the services present in the service seeker database, the service seeker 410 can notify (422) a launcher 424 and/or a notification framework 426. The launcher 424 can respond to the notification that a given service has been found by launching a task of an application 406 or other code that has registered an interest in the given service. The notification framework 426 can respond to the notification that the given service has been found by sending a notification to a user, application, or other entity.

The service seeker 410 can also cooperate with the connection manager 412 to autonomously associate with the AP 106, or alternatively, to notify (using the notification framework 426) a user, application, or other entity (e.g. operating system, third party code, etc.) of various information received in the PAD procedure, to allow the user, application, or other entity to decide whether or not to associate with the AP 106.

Service Proxy API

Figure 4:
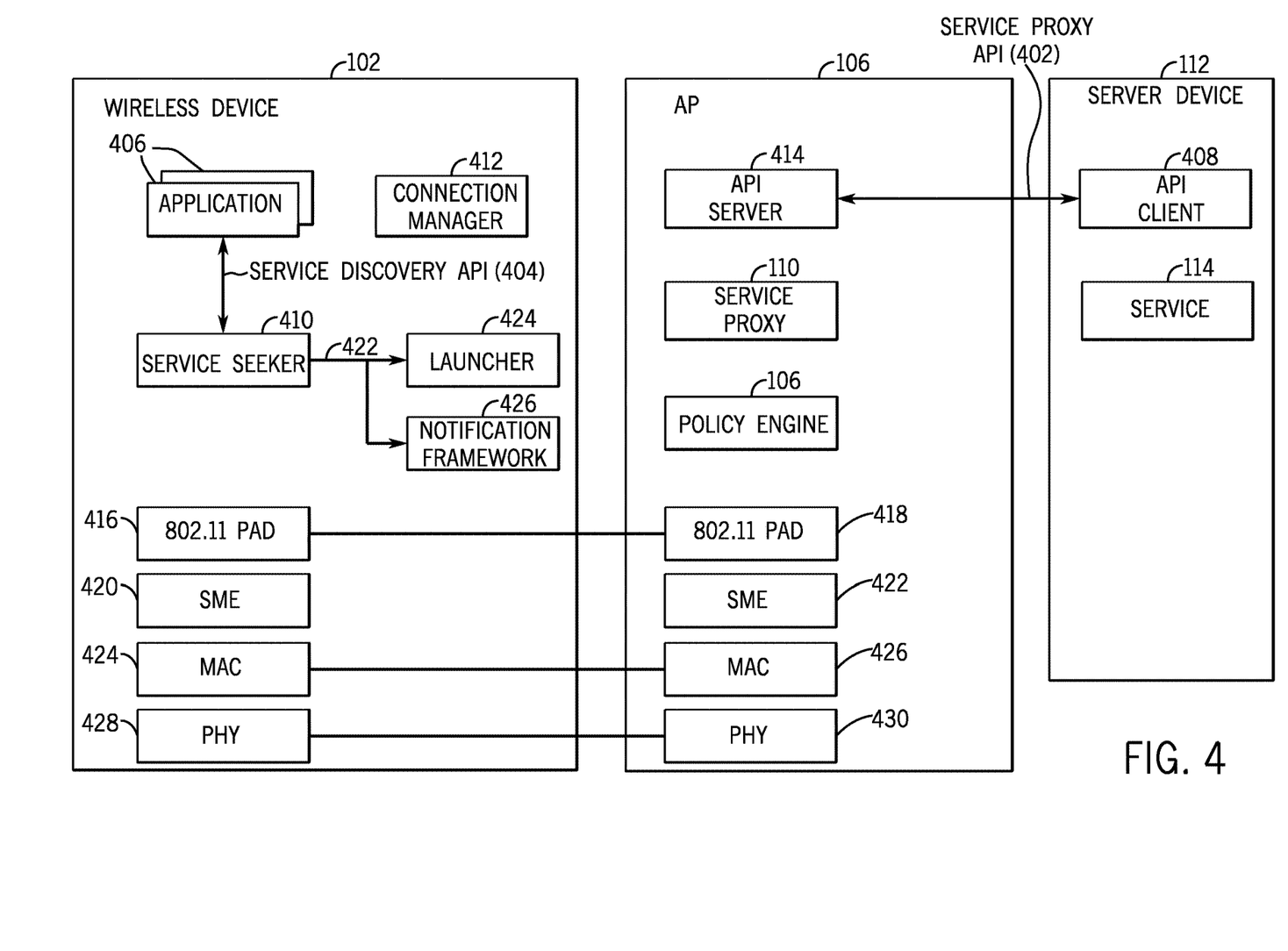
FIG. 4 is a block diagram of an example arrangement including a wireless device, a WLAN network node, and a server device, according to some implementations.

As further shown in FIG. 4, an API client 408 in the server device 112 (that provides the service 114 to be advertised by the AP 106) can register and unregisters the service 114 with the AP 106 for advertisement. The API client 408 can call a function or routine of the service proxy API 402 to perform the registration or deregistration of the service 114.

An API server 414 in the AP 106 is responsive to the call of the service proxy API 402 by the API client 408 to perform the service registration or deregistration task. The service proxy API 402 is accessible by server devices that are associated with a network (e.g. WLAN or LAN) that the AP 106 is part of.

In some examples, the service proxy API 402 can be implemented using any of the following techniques: Simple Object Access Protocol (SOAP)/Extensible Markup Language (XML); Hypertext Transfer Protocol (HTTP) GET and POST commands; a RESTful API according to a Representational State Transfer (REST) framework; and so forth. As an example, the API client 408 or other code running in the server device 112 can make an HTTP GET or POST command (through the service proxy API 402) to a web server (e.g. API server 414) running in the AP 106.

In response to commands communicated through the service proxy API 402 over a network connection between the server device 112 and the AP 106, the AP 106 can carry out operations to add or remove services in the service proxy 110. In many cases, services are provided on a server device that is separate and different from the AP 106 or other WLAN network node. However, in other examples, a service can be provided by the AP 106 or other WLAN network node itself.

The foregoing describes examples where a server device is able to register with the AP 106 that the server device offers a respective service.

In other examples, other ways of adding services to the service proxy 110 can be used. For example, an administrator or other user can manually provision services into the service proxy 110 using a management console.

As another example, the AP 106 can discover, using service discovery protocols used either with wired LAN devices or wireless associated devices, services provided by such devices. Some discovery protocols are passive where the AP can receive service advertisements (such as L2 or L3 broadcast frames), while other discovery protocols involve the AP actively sending queries to server devices to discover services. Protocols such as UPnP, DNS-SD, or Bonjour can be used for sending queries to discover services. Note that some service discovery protocols can be entirely passive where the AP simply receives and decodes broadcast messages, while other service discovery protocols involve the AP initiating a search of a network.

The AP then advertises services as discussed further above, such as by broadcasting beacon frames that contain a service hash or service hint in an unsolicited PAD procedure, by sending a Probe Response containing a service hash in a solicited PAD procedure, or sending an ANQP response containing information of the service.

As further shown in FIG. 4, each of the wireless device 102 and the AP 106 includes a respective 802.11 PAD layer 416 and 418, to perform an exchange of messages associated with PAD operations. In addition, each of the wireless device 102 and the AP 106 includes a respective 802.11 Station Management Entity (SME) layer 420 and 422, to control the lower layer operations. In addition, each of the wireless devices 102 and the AP 106 includes a Medium Access Control (MAC) layer 424 and 426, and a physical (PHY) layer 428 and 430 to perform an exchange of various messages, such as beacon frames, Probe Requests and Responses, and/or ANQP requests and responses.

In other examples, other types of protocol layers can be employed for communications of messages and other information between the wireless device 102 and the AP 106.

Storing Services in the Service Proxy

For the case where services are registered directly from an administrator management console or using the service proxy API 402 (FIG. 4), the storage of service information about the services in the service proxy 110 is straightforward.

Figure 5:
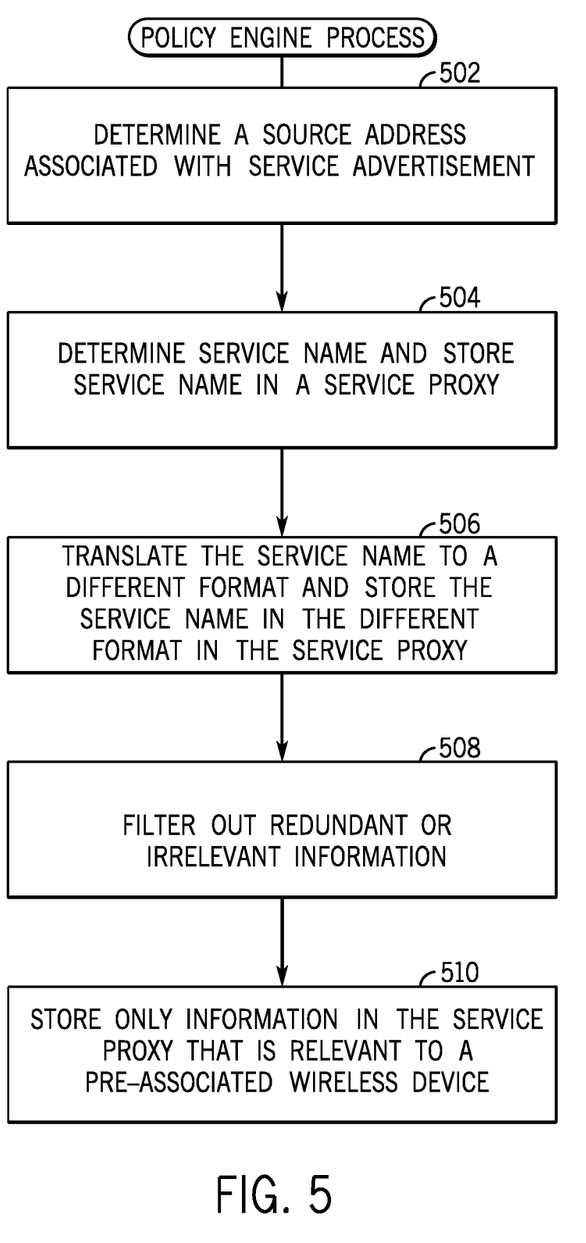
FIG. 5 is a flow diagram of an example process of a policy engine according to some implementations.

In the cases where service information is collected from service advertisements of various protocols received from associated WLAN stations and other devices coupled to the AP 106, some translation, filtering, or other processing may have to be performed, as shown in FIG. 5. The policy engine 108 can determine (at 502) a source address of a server device that provided the service advertisement and stores the source address in the service proxy 110. The source address can be an IP address, a MAC address, a host name, a fully qualified domain name (FQDN), or other address.

The policy engine 108 determines (at 504) the service name and stores the service name in the service proxy 110. The format of the service name can be dependent on the service discovery protocol used on the LAN/WLAN. If appropriate, the policy engine 108 translates (at 506) the service name from a format received according to the service discovery protocol to a format compatible with the WLAN PAD protocol. The policy engine 108 may store the service name in the different format, such as a hashed service name or a truncated hashed service name, in the service proxy 110.

The policy engine 108 reads the full extent of information provided in the service advertisement and filters out (at 508) any redundant or irrelevant information. The policy engine 108 stores (at 510) only information in the service proxy 110 that is useful to a pre-associated wireless device. As an example, a domain name may be filtered from an FQDN leaving only a local hostname.

Policies to Filter Advertised Services

As noted above in connection with FIG. 3, filtering of service information (at 310) can be performed prior to advertising services to a wireless device. Such filtering is based on one or more policies. Some example policies are provided below.

Time of Day Policy

A time of day policy can include a time of day (or other time interval) at which to start advertising a given service and a time of day (or other time interval) at which to stop advertising the given service. For example, the given service should only be advertised during business hours from 9 am to 5 pm. Such a policy may apply to the given service, or all services advertised by the AP.

Date Policy

A date policy can include dates on which to advertise a certain service or not. For example the service may be advertised from Monday to Friday, but not on Saturday and Sunday or holidays. Such a policy may apply to a particular service, or to all services advertised by the AP.

Maximum Bandwidth Policy

A maximum bandwidth policy can specify that, when a maximum bandwidth of a network is used by the AP (e.g. utilization of a backhaul network, utilization of an over-the-air connection, etc.), the policy engine 108 can scale back on the number of service responses sent to wireless devices for advertising services. In the case of ANQP responses, a throttling indication can be sent to wireless devices to prevent the wireless devices from sending repeated queries. For example, if a large number of users on the AP are using a particular service, the AP may refrain from advertising that service until network bandwidth resources free up. While in the general case APs are logically decoupled from any services delivered on its network, one implementation may have a vertically integrated AP service stack, for example for VOIP traffic. The AP may be provisioned for a certain maximum number of simultaneous calls and refrain from advertising the VOIP service once the AP has reached the maximum number of simultaneous calls.

Maximum Number of Services Policy

A maximum number of services policy can specify a maximum number of services that an AP can advertise at a given time. A last-in first-out type queue may be used to only advertise the most recent services. In another implementation, the maximum number of services policy may prevent advertising of any new services until one of the existing services is removed from the queue.

Time to Live Policy

A time to live policy may specify how long a service is advertised. For example a service may be advertised for an hour and the AP will cease advertising the service after that time expires. In some cases the server device advertising a service may renew the time to live before an associated timer expires to allow the AP to continue advertising the service.

Known Device Policy

A known device policy may specify what wireless devices are to receive which advertised services. For example, the policy engine 108 can provide different information in response to service information requests depending on the identity or other information about requesting wireless devices. Closed groups of wireless devices can be formed, and the AP can send specific service information about services advertised to this group of wireless devices. The closed group may involve devices filtered by MAC address or another identifier such as a Device Provisioning Protocol (DPP) public key, Organizationally Unique Identifier (OUI) or similar.

The closed group may include only devices that have successfully authenticated with the AP in the past, or that are otherwise known to a basic service set (BSS), extended service set (ESS), or network. The grouping may be done via a whitelist or blacklist mechanism. The whitelist lists wireless devices that are to receive certain service advertisement information, and the blacklist lists wireless devices that are not to receive certain service advertisement information. A blacklist for example can contain rogue devices that have repeatedly requested service information in the past, and which have been banned (either temporarily or permanently) by the AP in order to save bandwidth and processing resources.

Policy Engine Handling of Multiple Instances of a Service

In some cases there may be multiple instances of the same service running in a network. An example of this is that there are two printers connected to the AP via a LAN, and another printer associated with a WLAN. In this case the service proxy 110 may store information from all three printers that are different. The different printers may include a laser printer, an inkjet printer, and a wide format plotter.

Table 1 below provides an example of information that can be stored in the service proxy 110 for the three printers:

TABLE 1

| Service Name | Additional Service Information |
|---|---|
| Print | Type = Laser |
|  | Name = LaserJet 6000 |
| Print | Type = Inkjet |
|  | Name = DeskJet 300 |
| Print | Type = Wide Format Plotter |
|  | Name = Plotter 100 |

Table 1 has a Service Name column to identify the name ("Print") of the print service. The second column of Table 1 includes different information for the three instances (three different printers) of the print service.

The policy engine 110 can remove duplicated service information for services advertised via beacons or Probe Responses. In the example above the policy engine 110 can simply advertise the service name "Print." The service seeker 410 (FIG. 4) may seek the print service and when the service seeker 410 discovers an AP advertising the print service (via solicited PAD or unsolicited PAD), the service seeker 410 can choose to connect to the AP. However some service seekers may want to know more information before choosing to connect to the AP via which the service is available. For example, the service seeker 410 can send a Service Information Request ANQP query for the print service. The policy engine 110 can then send additional service information for the multiple printers of the print service. The service seeker 410 may present a list of the multiple printers and their additional information (or a subset of such information) to the user to take action, or may automatically connect to the AP based on the information matching criteria of the user or applications.

Service Proxy Definition

The following is a list of example fields that can be stored in the service proxy 110 (or more specifically, a database of the service proxy 110). These same fields can be sent to pre-associated wireless devices. Although specific example fields are listed in example Table 2 below, it is noted that in other examples, other fields can be stored in the service proxy 110. Please note that the format and definitions of the fields are provided as examples, and these may change in other examples.

TABLE 2

| Fields | Description | |
|---|---|---|
| Service Name | String of text (e.g. 63 octets) | This text may be in a number of formats to promote interoperability. UPnP URN, RFC6335 label, reverse domain name notation, etc. |
| Service Hash | Hash of the service name (e.g. SHA hash truncated to 6 bytes) | The hash is generated from the "Service Name" string and is truncated (e.g. to 6 octets). This can be computed once and stored in the service proxy or can be computed at runtime from the Service Name. |
| Host Name/Device Identity | String of text identifying the host that provides the service | The host name or device identity may be used for deduplication within the PAD Proxy Entity but may or may not sent over the air. |
| IP Address | IPv4 and/or IPv6 address identifying the device that provides the service | The IP address can be used for deduplication within the PAD Proxy Entity but may or may not sent over the air. |
| TLVs for the Key-Value Pairs | These are type/length/value triplets that contain "Additional Information" | By definition this can contain almost any name/value pair that is then sent in the Service Information Response ANQP element. It contains additional information about the service. The information may be translated from "upper layer" or "legacy" service discovery protocol such as Bonjour, UPnP, etc. |
| NAI Realms | Network access identifier | Realm information to segregate information to a local context. |
| Groups | Groups of users or devices, such as the IT Groups in an enterprise | Can be based on LDAP groups, X.509 Organization field. |
| Advice of Charge | Cost to use said service | Multiple currencies, dynamic cost versus time of day. Can be managed by the policy engine. Can include free trials. |
| Priority | Priority relative to other services in the service proxy | Can be an integer from a set of priority levels, or a binary high priority/low priority flag. |
| Time to Live | Length of time which the service is to be advertised | Can be a duration, or a specific timestamp at which time the advertisement expires. |
| Advertisement ID | Unique identifier. | This may or may not be the database key. This allows for duplicate instances of the same service name. Can be a UUID, serial number, database tuple or other identifier. |

The policy engine 108 manages what data is stored in the service proxy 110, as well as what data from the service proxy 110 is transmitted in PAD procedures.

Service Proxy API

The Service Proxy API 402 shown in FIG. 4 can be used by server devices to register services with the service proxy 110. The server devices can include for example WLAN devices associated with the AP, LAN devices connected to the AP and management console applications running on the AP.

The following describes example functions of the Service Proxy API 402 that can be used to register a service or unregister a service. The Service Proxy API 402 can be implemented as a REST API on the AP (or other WLAN network node), a SOAP/XML interface, or as an HTTP interface over which HTTP requests can be submitted.

Registering a Service to be Advertised

An example function of the service proxy API 402 to register a service is as follows:

AdvertiseService(service_name, service_additional_info, configuration_parameters, advertise_ID).

This function is called by a server device which wants to register a service to be advertised by an AP. The function includes a service name ("service_name") or other service identifier (such as a hash of a service name or service ID). The function may optionally also contain additional information ("service_additional_info") about the service, configuration information ("configuration_parameters" such as a time to live, priority level, etc.). The function may also include a unique advertisement ID ("advertise_ID") that allows for multiple instances of the same service name (this can for example be a UUID).

Unregistering the Advertising of a Service

An example function of the service proxy API 402 to unregister a service is as follows:

CancelAdvertiseService(advertise_ID).

This function is called by a server device which previously registered a service, and the calling of the function causes service information of the service to be removed from the service proxy 110.

Service Discovery API

The service discovery API 404 of FIG. 4 can exist as system level functions in a wireless device operating system, for example, or as another component.

Registering a Service to Seek

The following function can be called by an application 406 (FIG. 4) or other code to register (with the service seeker 410) a service sought by the application 406 or other code:

SeekService(service_name, service_additional_info, configuration_parameters )

After providing the service name ("service_name") of the service that is sought, the service seeker 410 will use PAD procedures to find an AP having a service that matches the service name that is being sought. A positive match may be returned to the calling application, or alternatively, another system level notification can be invoked. In other examples, other operations may be performed as discussed further below.

Additional information may be included to seek and match more than just the service name. For example the service name may be Print, and the additional information allows the wireless device to seek a printer that has additional properties, such as color print properties.

Configuration parameters can be included in the function call with information such as a time-to-live so that the device only seeks the service for a fixed amount of time as well as a priority level in case there are multiple applications on the device all seeking different services. The service seeker 110 can seek out higher priority services before services of lower priority.

Unregistering the Seeking of a Service

The following function can be called by an application 406 (FIG. 4) or other code to register (with the service seeker 410) a service sought by the application 406 or other code:

CancelSeekService(service_name).

This function is called by an application or other code that no longer wants to seek a service. For example, this function may be called when an application closes and does not want to continue seeking its service in the background.

Additional Service Seeking Functions

A PAD phase completes when an AP is found that advertises the service sought. In accordance with some implementations of the present disclosure, the service seeker 410 (FIG. 4) may perform additional operations in response to finding the service sought. Upon discovering an AP providing the service, the service seeker 410 may interact with the connection manager 412 to associate and authenticate with the network. The service seeker 410 may then perform post-association service discovery operations, and session setup. In some implementations, the foregoing tasks may be performed by the service seeker 410, while in other implementations, the service seeker 410 may invoke the connection manager 412 and/or network topology management modules to perform the tasks.

When everything from PAD to session setup is rolled into a single API operation, the service discovery for Wi-Fi Direct and Wi-Fi APs can be combined into a common operation. In this case, for example, an application calls a single unified API to discover the print service and both Wi-Fi Direct and Wi-Fi infrastructure connected printers can be discovered.

System Architecture

Figure 6:
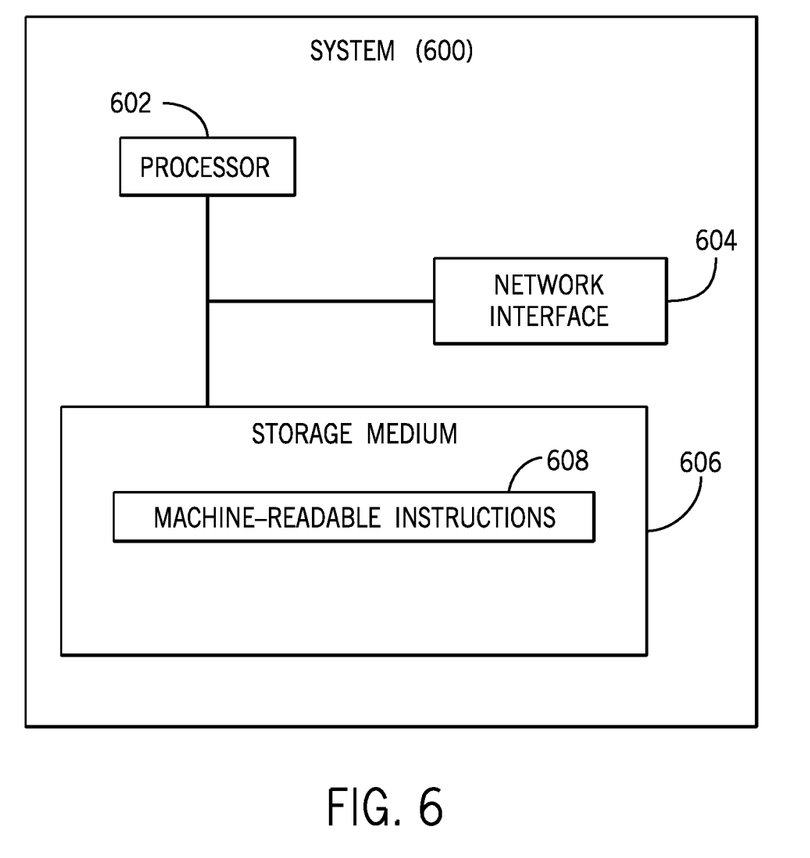
FIG. 6 is a block diagram of an example system according to some implementations.

FIG. 6 is a block diagram of an example system 600, which can represent any one of: a wireless device, an AP, a WLAN gateway or WLAN controller, or a server device. The system 600 can be implemented as a computing device or an arrangement of multiple computing devices.

The system 600 includes a processor (or multiple processors) 602, which can be coupled to a network interface (or multiple network interfaces) 604 to communicate with another entity, either wirelessly or over a wired link. A processor can include a microprocessor, a microcontroller, a physical processor module or subsystem, a programmable integrated circuit, a programmable gate array, or another physical control or computing circuit.

The processor(s) 602 can also be coupled to a non-transitory machine-readable or computer-readable storage medium (or storage media) 606, which can store machine-readable instructions 608 that are executable on the processor(s) 602 to perform various tasks as discussed above.

The storage medium (or storage media) 606 can include one or multiple computer-readable or machine-readable storage media. The storage medium or storage media can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   filtering, based on a first policy by a network node of a wireless local area network (WLAN), information about services available via the network node, the first policy being a privacy policy based on inspection of content of the information about the services to ensure unwanted information is not conveyed to unassociated wireless devices;
   further filtering, by the network node, the information about the services based on a second policy relating to at least one condition of the network node, the second policy being based on at least one of a channel load of a communication channel, or a maximum bandwidth of a network, the filtering and the further filtering producing filtered information about the services;
   transmitting, by the network node to the unassociated wireless devices as part of a pre-association discovery operation, the filtered information about the services; and
   associating, by the network node, with a first unassociated wireless device of the unassociated wireless devices in response to selection of the network node by the first unassociated wireless device based on the pre-association discovery operation.

2. The method of claim 1, wherein the information about the services is stored in a service database before the filtering and the further filtering.

3. The method of claim 1, wherein the information about the services is stored in a service database after the filtering and the further filtering.

4. The method of claim 1, wherein the first policy is to prevent transmission of one of an Internet Protocol (IP) address or port information to the unassociated wireless devices.

5. The method of claim 1, wherein the information about the services is obtained from multicast Domain Name System (DNS) service discovery frames received by the network node on a local area network (LAN) interface of the network node, wherein the filtering and the further filtering are of the information about the services obtained from the multicast DNS service discovery frames.

6. The method of claim 1, wherein the information about the services is received by the network node via an application programming interface (API) for registering services.

7. The method of claim 1, wherein the information about the services is input to a management console by an operator of the network node.

8. The method of claim 1, further comprising:
receiving, by the network node, the information about the services from one or more server devices that provide the services.

9. The method of claim 1, wherein the filtering comprises one or more of:
removing a subset of information from the information about the services, or
selecting a subset of information from the information about the services.

10. A network node for a wireless local area network (WLAN), comprising:
at least one processor; and
a non-transitory storage medium storing instructions executable on the at least one processor to:
obtain information about services from multicast Domain Name System (DNS) service discovery frames received on a local area network (LAN) interface of the network node, the services being available via the network node;
filter, based on a first policy, the information about the services obtained from the multicast DNS service discovery frames, the first policy being a privacy policy based on inspection of content of the information about the services to ensure unwanted information is not conveyed to unassociated wireless devices;
further filter the information about the services obtained from the multicast DNS service discovery frames based on a second policy relating to at least one condition of the network node, the second policy being based on at least one of a time-of-day, a channel load, or a maximum bandwidth, the filtering and the further filtering to produce filtered information about the services;
transmit, to the unassociated wireless devices as part of a pre-association discovery operation, the filtered information about the services; and
associate with a first unassociated wireless device of the unassociated wireless devices in response to selection of the network node by the first unassociated wireless device based on the pre-association discovery operation.

11. The network node of claim 10, wherein the information about the services is stored in a service database before the filtering and the further filtering.

12. The network node of claim 10, wherein the information about the services is stored in a service database after the filtering and the further filtering.

13. The network node of claim 10, wherein the first policy is to prevent transmission of one of an Internet Protocol (IP) address or port information to the unassociated wireless devices.

14. The network node of claim 10, wherein the instructions are executable on the at least one processor to further obtain the information about the services via an application programming interface (API) for registering services.

15. The network node of claim 10, wherein the instructions are executable on the at least one processor to further obtain the information about the services based on input to a management console by an operator of the network node.

16. A non-transitory machine-readable storage medium comprising instructions that upon execution cause a wireless local area network (WLAN) network node to:
filter, based on a first policy, information about services available via the network node, the first policy being a privacy policy based on inspection of content of the information about the services to ensure unwanted information is not conveyed to unassociated wireless devices;
further filter the information about the services based on a second policy relating to at least one condition of the network node, the second policy being based on at least one of a channel load of a communication channel, or a maximum bandwidth of a network, the filtering and the further filtering to produce filtered information about the services;
transmit, to the unassociated wireless devices as part of a pre-association discovery operation, the filtered information about the services; and
associate with a first unassociated wireless device of the unassociated wireless devices in response to selection of the network node by the first unassociated wireless device based on the pre-association discovery operation.

17. The non-transitory machine-readable storage medium of claim 16, wherein the first policy is to prevent transmission of one of an Internet Protocol (IP) address or port information to the unassociated wireless devices.

18. The non-transitory machine-readable storage medium of claim 16, wherein the instructions upon execution cause the WLAN network node to obtain the information about the services from multicast Domain Name System (DNS) service discovery frames received on a local area network (LAN) interface of the network node, wherein the filtering and the further filtering are of the information about the services obtained from the multicast DNS service discovery frames.

19. The non-transitory machine-readable storage medium of claim 16, wherein the instructions upon execution cause the WLAN network node to receive the information about the services via an application programming interface (API) for registering services.

* * * * *